US008408243B2

(12) United States Patent
Suzuki et al.

(10) Patent No.: US 8,408,243 B2
(45) Date of Patent: Apr. 2, 2013

(54) VALVE DEVICE

(75) Inventors: Hiroaki Suzuki, Nagoya (JP); Takuya Suzuki, Anjo (JP); Munetoshi Kuroyanagi, Aichi (JP); Toshihiko Shima, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 836 days.

(21) Appl. No.: 12/486,206

(22) Filed: Jun. 17, 2009

(65) Prior Publication Data

US 2009/0308465 A1 Dec. 17, 2009

(30) Foreign Application Priority Data

Jun. 17, 2008 (JP) ................................ 2008-158366

(51) Int. Cl.
*F16K 31/124* (2006.01)

(52) U.S. Cl. ............... 137/505.41; 137/505.38; 137/812

(58) Field of Classification Search ............. 137/505.38, 137/505.41, 505.42, 808, 812
See application file for complete search history.

(56) References Cited

U.S. PATENT DOCUMENTS 3,221,762 A * 12/1965 Chinn ........................ 137/116.5
5,123,436 A * 6/1992 Koechlein et al. .............. 137/12
7,222,836 B2 * 5/2007 Chen ............................ 251/321
7,234,489 B2 * 6/2007 Bowe et al. ................... 137/813
2008/0105840 A1 * 5/2008 Suzuki et al. .................. 251/62

FOREIGN PATENT DOCUMENTS

JP 7-35257 2/1995
JP 2005-325891 11/2005

OTHER PUBLICATIONS

JP 07-035257 A—translation.*

* cited by examiner

*Primary Examiner* — John Rivell
*Assistant Examiner* — Angelisa Hicks
(74) *Attorney, Agent, or Firm* — Oblon, Spivak, McClelland, Maier & Neustadt, L.L.P.

(57) ABSTRACT

A valve device includes: a valve member that controls flow of a fluid, and a body that has a valve insertion hole in which the valve member is inserted, and whose inner surface is cylindrically formed, and into which the fluid flows, and a lead-in passage that has an opening in the inner surface of the valve insertion hole, and that causes the fluid to flow into the valve insertion hole. A line representing the direction of extension of the lead-in passage is tilted from a line normal to the inner surface of the valve insertion hole at a position of the opening of the lead-in passage, in a view in the axis direction of the valve insertion hole.

9 Claims, 3 Drawing Sheets

VALVE DEVICE

INCORPORATION BY REFERENCE

The disclosure of Japanese Patent Application No. 2008-158366 filed on Jun. 17, 2008 including the specification, drawings and abstract is incorporated herein by reference in its entirety.

BACKGROUND OF THE INVENTION

1. Field of the Invention

The invention relates to a valve device and, more particularly, to a weight-reduced valve device that is applicable to a gas tank that stores a high-pressure gas such as hydrogen gas or the like.

2. Description of the Related Art

The tap body that closes an opening portion of a gas tank that stores a high-pressure fluid is provided with a valve device which has one or more passages that connect between the inside and the outside of the gas tank, and which controls the flow of gas within the passages. An example of the valve device is a pressure reducing valve that controls the pressure of the gas that is led to the outside.

The valve device has a valve member that includes a valve element and the like, and also has a body within which a valve insertion hole in which the valve member is mounted is formed. An end of a lead-in passage that introduces the high-pressure fluid has an opening to the valve insertion hole.

By the way, vehicles that employ fuel cells are being developed in recent years. In a method of a fuel cell, high-pressure hydrogen gas is used as a fuel. The gas tank used to store the high-pressure hydrogen gas, including attachment appliances, such as the valve device and the like, is required to have a reduced weight. For example, in order to reduce the weight of the valve device, an attempt to form a body from an aluminum alloy whose specific weight is small is being made (Japanese Patent Application Publication No. 2005-325891 (JP-A-2005-325891), and the like).

Incidentally, since the valve member needs to have a certain degree of size, the inside diameter of the valve insertion hole in which the valve is mounted is larger than the inside diameter of the lead-in passage through which a high-pressure gas is introduced. Therefore, in the case where an end of the lead-in passage is opened to the interior of the valve insertion hole, the opening of the end of the lead-in passage is formed in the relatively smooth inner surface of the valve insertion hole. Therefore, a sharp angle is formed at the opening portion where the lead-in passage is opened to the inner surface of the valve insertion hole. As a result, the concentration of stress occurs at corners. As described above, in the case where an aluminum alloy is used as the material of the body in order to reduce the weight of the valve device, decline of the durability due to stress concentration becomes a problem. In order to suppress the stress concentration, it is conceivable to change a once-formed sharp angled corner or edge into an obtuse angle by a post-processing. However, the post-processing gives rise to a problem of un-ignorable increases in cost.

SUMMARY OF THE INVENTION

It is an object of the invention to provide a valve device that is high in durability despite being reduced in weight.

A valve device in accordance with an aspect of the invention includes: a valve member that controls flow of a fluid; and a body that has a valve insertion hole in which the valve member is inserted, and whose inner surface is cylindrically formed, and into which the fluid flows, and a lead-in passage that has an opening in the inner surface of the valve insertion hole, and that causes the fluid to flow into the valve insertion hole. The lead-in passage is tilted with respect to a normal line to the inner surface of the valve insertion hole at a position of the opening of the lead-in passage, in a view in an axis direction of the valve insertion hole.

In the valve device in accordance with this aspect, since the direction in which the lead-in passage, that is, a passage for introducing the fluid, is formed is tilted with respect to a normal line to the inner surface of the valve insertion hole, the concentration of stress in an opening edge of the opening of the lead-in passage that is open in the inner surface of the valve insertion hole can be alleviated. The lead-in passage is tilted with respect to the normal line to the inner surface of the valve insertion hole at the position of the opening of the lead-in passage, in a view taken in the axis direction of the valve insertion hole. In other words, the lead-in passage is tilted from the normal line to the inner surface of the valve insertion hole at the opening of the lead-in passage toward the circumferential direction of the valve insertion hole. Since the stress concentration in the opening edge of the opening of the lead-in passage can be suppressed, the durability of the valve device can be improved.

In the valve device in accordance with the foregoing aspect, the lead-in passage may extend in a plane perpendicular to a center axis of the valve insertion hole.

In this construction, since the lead-in passage extends in a plane perpendicular to a center axis of the valve insertion hole, the concentration of stress can be effectively alleviated.

Besides, in the valve device in accordance with the foregoing aspect, the lead-in passage may be a hole that extends straight, and an extension line of the lead-in passage which extends toward the opening of the lead-in passage may have an offset from a center axis of the valve insertion hole.

In this construction, since the lead-in passage is straight, the working thereof is easy, and the concentration of stress can be sufficiently alleviated by providing the extension line of the lead-in passage with an offset from the center axis of the valve insertion hole.

Besides, in the valve device in accordance with the foregoing aspect, the valve member may be a pressure reducing valve.

In this construction, since the pressure reducing valve is adopted, high performance can be achieved. Since the magnitude of stress fluctuates as the pressure reducing valve opens and closes highly frequently, the stress concentration reducing effect appears remarkably with the pressure reducing valve.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, the valve device of the invention will be described with reference to the drawings regarding an embodiment in which the valve device is embodied as a pressure reducing valve that reduces, to a predetermined pressure, the pressure of a hydrogen gas stored in a hydrogen gas tank that stores the hydrogen gas as a high pressure fluid whose pressure is 35 MPa or higher in the right condition of the energy efficiency. Since the embodiment is a valve device that handles high-pressure hydrogen gas, high performance of the invention can be achieved in the embodiment. If such a high-pressure gas passes through the valve device, very high stress occurs in the valve device, so that the effect of reducing the stress concentration will remarkably appear.

Figure 1:
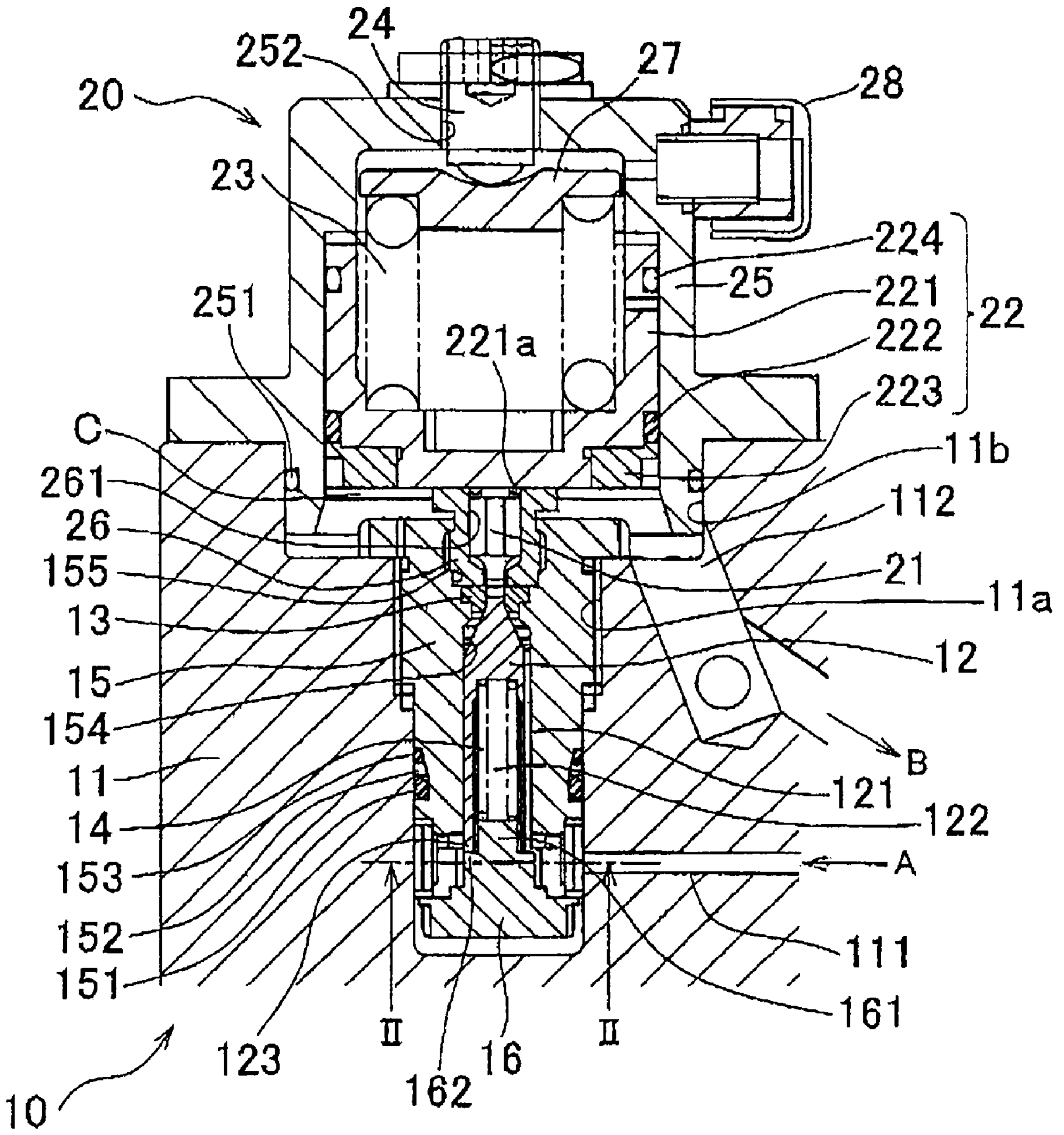
FIG. 1 is a schematic partial sectional view of a valve device in an embodiment.

(CONSTRUCTION) The pressure reducing valve of this embodiment is, as shown in FIG. 1, a valve in which the high-pressure hydrogen gas introduced into an lead-in passage 111 in a direction A is depressurized to a predetermined pressure, and is led out of a lead-out passage 112 in a direction B. A gas lead-out opening (not shown) of a high-pressure hydrogen tank (not shown) that stores high-pressure hydrogen gas is connected to the lead-in passage 111, and the lead-out passage 112 is connected to a hydrogen supply opening (not shown) of a device (not shown) that needs to be supplied with hydrogen.

The pressure reducing valve of this embodiment has a valve mechanism 10, and a pressure-regulating mechanism 20.

The valve mechanism 10 has a body 11, a poppet 12, a seat 13, and other members. The body 10 is formed of an aluminum alloy. The aluminum alloy may be, for example, A6061 (A6061-T6) subjected to a heat treatment. The pressure-regulating mechanism 20 has a pin 21, pressure-regulating piston 22, a spring 23, a pressure-regulating screw 24, a cover 25, and other members.

(VALVE MECHANISM 10) The poppet 12 is a columnar part whose distal end portion is a generally conical shape that tapers. The valve mechanism 10 is opened and closed as an outer peripheral surface of the generally conical distal end portion comes into and moves apart from a hole that is formed in the seat 13. Of the generally conical distal end portion of the poppet 12, a portion close to the distal end tip is provided with a columnar member whose distal end portion is flat. The seat 13 is provided with a hole into which the distal-end columnar member can be inserted with a clearance of a certain size. As the distal-end columnar member is pushed in the direction of the axis, the poppet 12 is moved in the direction of the axis. The distal-end columnar member is pressurized by a pin 21 of the pressure-regulating mechanism 20. That is, the poppet 12 is appropriately pushed by the pin 21 to open or close the valve mechanism 10, and thus controls the pressure of hydrogen gas that flows out.

A spring housing portion 122 that is a columnar hollow that is open in a direction opposite to the direction toward the generally conical portion is formed within the poppet 12. A spring 14 is disposed within the spring housing portion 122. An end of the spring 14 is in contact with the spring housing portion 122 of the poppet 12, and the spring 14 urges the poppet 12 in the direction to the distal end side of the poppet 12. The urging force of the spring 14 (the elastic force thereof) is set at a value that is sufficiently smaller than the urging force of a spring 23 described later. The other end of the spring 14 is stopped by a stopper member 16. An end portion of the stopper member 16 is a protrusion portion 161. As the protrusion portion 161 is inserted, from the end thereof, into the spring housing portion 122 formed in the poppet 12, the protrusion portion 161 loosely fits into the spring housing portion 122. The other end side of the protrusion portion 161 is provided with a stepped portion 162 that contacts an opening edge portion 19 that forms the spring housing portion 122 of the poppet 12, and thus regulates the stopper member 16 so that the protruded portion 161 of the stopper member 16 cannot be inserted into the spring housing portion 122 of the poppet 12 further than a certain extent. That is, the stepped portion 162 restricts the distance of movement of the poppet 12 in the axis direction. The poppet 12 is inserted in a guide hole 154 that is formed within a guide member 15, and the guide member 15 is movable in the axis direction thereof. The poppet 12 is disposed together with the guide member 15 in a valve insertion hole 11*a* that is formed within the body 11. The guide hole 154 is a hole that penetrates through the guide member 15. The opening diameter of the guide hole 154 has a size that allows the poppet 12 to pass through with substantially no clearance therebetween, except for an end portion of the guide hole 154. Besides, the length of the guide hole 154 in the axis direction is substantially the same as the length of the poppet 12. The one end portion of the guide hole 154 is an end portion thereof at a side where the generally conical portion of the poppet 12 is located, and the inside diameter of the one end portion of the guide hole 154 is made small so that the poppet 12 cannot pass through the one end portion of the guide hole 154. A seat 13 is fitted in the portion of the guide hole 154 that has the reduced inside diameter. A groove 121 extending in the axis direction is formed in an outer peripheral portion of the poppet 12 in order to form, between the outer peripheral portion and an inner peripheral portion of the guide hole 154, a space that allows passage of hydrogen gas.

The cylindrical valve insertion hole 11*a* having an open end is formed in the body 11. An opening portion of the valve insertion hole 11*a* is provided with an opening recess portion 11*b* whose inside diameter is made larger than the inside diameter of the opening portion of the valve insertion hole 11*a*. The lead-out passage 112 is formed extending in an oblique direction from a bottom surface of the opening recess portion 11*b*. The inside diameter of the lead-out passage 112 is larger than the below-described inside diameter of the lead-in passage 111. The stopper member 16 and the guide member 15 are disposed in that order from the dead end of the valve insertion hole 11*a*. A threaded groove is formed in a portion of the inner surface of the valve insertion hole 11*a* of the body 11 in which the stopper member 16 and the guide member 15 are disposed. The stopper member 16 and the guide member 15 provided with corresponding thread grooves in the outer peripheries thereof are screwed into the valve insertion hole 11*a*, and are thereby secured. A space is formed between the stopper member 16 and the guide member 15, extending in the axis direction of the valve insertion hole 11*a* of the body 11. Through this space, hydrogen gas is passed. An end opening of the lead-in passage 111 is formed in the valve insertion hole 11*a* of the body 11, at a position that corresponds to the space formed between the stopper member 16 and the guide member 15. The inside diameter of the lead-in passage 111 is smaller than the inside diameter of the valve insertion hole 11*a* of the body 11. The lead-in passage 111 is described later. A seal member 151, which is an O-ring, is provided between the guide member 15 and the valve insertion hole 11*a* of the body 11. Since the seal member 151 is urged upward in the drawing of FIG. 1 by the pressure of the hydrogen gas, back-up rings 152 and 153 are disposed adjacent to the seal member 151 (on the upper side thereof in the drawing).

(PRESSURE-REGULATING MECHANISM 20) The pin 21 is a columnar member whose distal end portion has a generally conical shape. A columnar member whose distal end is flat is formed on a distal end of the generally conical shaped portion of the pin 21. The diameter of the columnar member is about the same as the diameter of the columnar member that is formed on the distal end of the foregoing poppet 12, and the distal end portion of the pin 21 pushes the distal end portion of the poppet 12. The pin 21 is inserted in a hole 261 that has substantially the same diameter and that is formed in a pin guide member 26. The hole 261 formed in the pin guide member 26 is a cylindrical hole. Besides, the inside diameter of one end of the hole 261 formed in the pin guide member 26 is smaller than the inside diameter of the other portion of the hole 261. The inside diameter of the one end of the hole 261 has a size that allows the distal end portion of the pin 21 to be inserted into the one end of the hole 261.

The pin guide member 26 is attached to the guide member 15, with the one end portion of the pin guide member 26 facing the guide member 15. A hole 155 in which the pin guide member 26 can be mounted is formed in the guide member 15. An outer periphery of the pin guide member 26 an d an inner surface of the hole 155 of the guide member 15 have thread grooves that can be screwed to each other. In addition, the seat 13 is clamped by the guide member 15 and the pin guide member 26, whereby the seat 13 is fixed. The pin 21 is movable in the axis direction within the pin guide member 26. As the pin 21 moves to the poppet 12 side, the pin 21 pushes the poppet 12 in the axis direction so that the valve mechanism 10 assumes an open valve state. Conversely, as the pin 21 moves in a direction away from the poppet 12, the pushing of the pin 21 on the poppet 12 disappears. An outer peripheral portion of the pin 21 has a prismatic shape, and thus forms spaces, together with the inner periphery of the hole of the pin guide member 26. Through the spaces, the hydrogen gas passes.

The other end portion of the pin 21 opposite to the distal end portion thereof is pushed by the piston 22. The pin 21 is clamped between the piston 22 and the poppet 12, and moves in the axis direction. The pin 21 is pushed by a distal end protrusion 221*a* of the piston 22. The size of the distal end protrusion 221*a* is determined such that when the piston 22 contacts the pin guide member 26, the distal end portion of the pin 21 pushes the poppet 12 so that the valve mechanism 10 assumes the open valve state. The piston 22 has a piston main body portion 221, a seal member 222, a holder 223, and a sliding member 224. The seal member 222 is an O-ring that maintains air-tightness between the piston 22 and the cover 25, and is retained on the piston main body portion 221 by the holder 223. Due to the sliding member 24, the piston 22 can be smoothly slid on the inner surface of the cover 25. One end portion of the cover 25 is open to a great extent, and the cover 25 is provided with a spring 23 that urges the piston 22 in a direction toward the one end portion. The cover 25 is fitted into the opening recess portion 11*b* of the body 11 so that the opening portion of the cover 25 and the opening portion of the body 11 face each other. The air-tightness between the two parts is maintained by a seal member 251. An end of the spring 23 urges the piston 22 in the direction to the pin 21, and the other end of the spring 23 is in contact with a spring stopper member 27 that is disposed within the cover 25. At a position on the spring stopper member 27 opposite from the position of the contact between the spring stopper member 27 and the spring 23, an adjustment screw 24 that pushes the spring stopper member 27 is disposed. The direction in which the adjustment screw 24 pushes the spring stopper member 27 is opposite to the direction in which the spring 23 urges the spring stopper member 27. The adjustment screw 24 is screwed into a screw hole 252 that is formed in the cover 25, at a position remote from the opening of the cover 25. By adjusting the degree of the screwing, the position of the spring stopper member 27 is adjusted. By displacing the position of the spring stopper member 27, the degree of compression of the spring 23 can be adjusted, and thus the magnitude of the urging force by which the spring 23 urges the piston 22 can be adjusted. An open valve 28 capable of connecting the outside and the inside of the cover 25 can be disposed.

Figure 2:
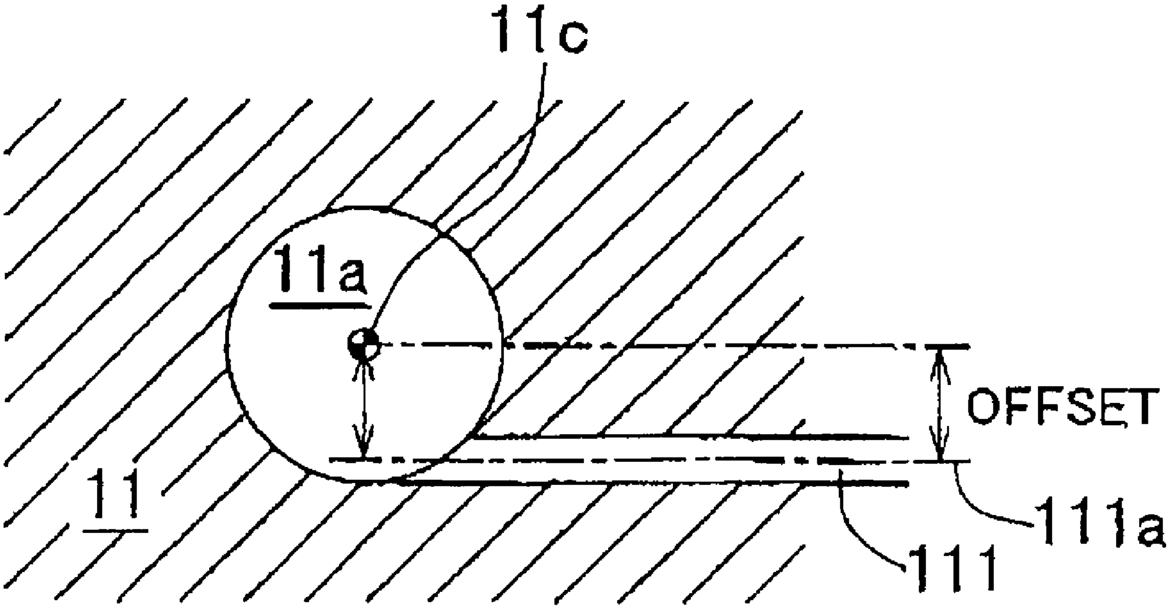
FIG. 2 is a schematic partial sectional view (taken on a plane II-II in FIG. 1) of the valve device in the embodiment.

(BODY 11) The lead-in passage 111 whose end is open to the valve insertion hole 11*a* of the body 11 is formed extending in a direction that is oblique to the inner surface of the valve insertion hole 11*a*. In particular, from the viewpoint of ease of working, the lead-in passage 111 may be formed as a straight hole. In that case, the axis of the linearly formed lead-in passage 111 and the axis of the cylindrical valve insertion hole 11*a* have an offset from each other, and do not intersect (i.e., are skew to each other). In particular, it is preferable that the lead-in passage 111 be formed along a tangent of a section of the valve insertion hole 11*a* of the body 11 taken across the axis thereof as shown in FIG. 2. In consequence, an extension of the center axis 111*a* of the lead-in passage 111 toward the valve insertion hole 11*a* has an offset from the center axis 11*c* of the valve insertion hole 11*a*. It is also preferable that the lead-in passage 111 be formed extending perpendicular to the direction of the axis of the valve insertion hole 11*a* of the body 11.

(OPERATION AND EFFECTS) The valve device of this embodiment, having the foregoing construction, delivers operation and effects as follows. Firstly, since the body 11 having a relatively great mass is formed of an aluminum alloy, a weight reduction can be achieved. Since high-pressure hydrogen gas is introduced into the valve insertion hole 11*a* of the body 11, the body 11 is required to have high strength. As the mass of the body 11 is inevitably great so as to meet the strength requirement, the weight reduction of the body 11 through the use of the aluminum alloy achieves a great weight reduction of the valve device as a whole.

Next, actions of the valve device will be described. In the case where hydrogen gas is led in from the lead-in passage 111 in the direction A, the led-in hydrogen gas moves along the groove 121 formed on the outer periphery of the poppet 12, and reaches a site where the seat 13 is disposed. If the distal end portion of the poppet 12 is in contact with the seat 13, the hydrogen gas cannot go any further. On the other hand, if the distal end portion of the poppet 12 is apart from the seat 13, the hydrogen gas passes through the seat 13, and then through a passage C defined by the piston 22, the cover 25, and the opening recess portion 11*b* of the body 11, and flows out of the lead-out passage 112 in the direction B.

A mechanism of the poppet 12 landing on and lifting from the seat 13 will be described. That is, when the force that the pressure in the passage C causes on the piston 22 becomes smaller than the urging force that the spring 23 applies to the piston 22 as the pressure in the passage C declines, the piston 22 is displaced toward the poppet 12 due to the urging force of the spring 23 (the elastic force thereof). Then, the distal end of the poppet 12 is pushed by the piston 22 via the pin 21, so that the poppet 12 moves apart from the seat 13. The pressure in the passage C declines as the hydrogen gas flow out from the lead-out passage 112.

On the other hand, when the force that the pressure in the passage C causes on the piston 22 becomes larger than the urging force that the spring 23 applies to the piston 22 as the pressure in the passage C heightens, the piston 22 is displaced in such a direction as to move away from the poppet 12, against the urging force of the spring 23. Then, the force acting on the poppet 12 in the direction away from the seat 13 disappears, and the poppet 12 contacts the seat 13 due to the urging force of the spring 14 (the elastic force thereof). The pressure in the passage C increases as hydrogen gas flows into the passage C from the lead-in passage 111.

Thus, the valve mechanism 10 is mechanically adjusted so that the pressure in the passage C is within a predetermined pressure range that is determined by the urging force (elastic force) of the spring 23. Since the urging force of the spring 23 can be adjusted by the displacement of the spring stopper member 27, the pressure in the passage C can be set in a predetermined range of pressure through the adjustment using the adjustment screw 24. That is, the pressure of the hydrogen gas led out of the lead-out passage 112 connected to the passage C also becomes able to be adjusted within a certain range.

Since the valve device of this embodiment adjusts pressure by the rapid opening and closing of the valve mechanism 10 in the above-described manner, it is conceivable that the pressure of hydrogen gas in the valve insertion hole 11*a* of the body 11 pulsates. It is to be noted herein that the hydrogen gas handled in this embodiment has very high pressure, and therefore the body 11 receives large and fluctuating stress. However, since the body 11 is constructed of an aluminum alloy, the stress that occurs in the body 11 is reduced in this embodiment. Concretely, the stress can be reduced, for example, by tilting the direction of formation of the lead-in passage 111 with respect to the direction of a normal line to the inner surface of the valve insertion hole 11*a* of the body 11 (i.e., a normal line to a portion of the inner surface where the lead-in passage 111 has the opening) as described above in conjunction with the lead-in passage 111.

Figure 3A:
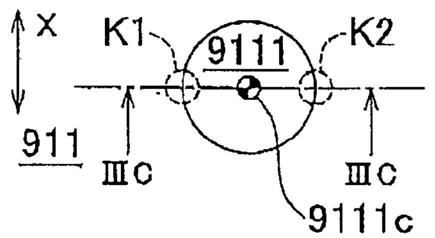
FIG. 3A is a schematic sectional view showing a direction of formation of the lead-in passage in the embodiment, and also is a partial enlarged view taken in the direction of an arrow H1 in FIG. 3C.
Figure 3B:
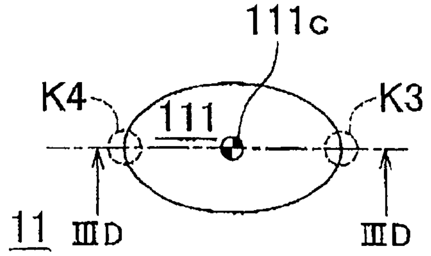
FIG. 3B is a schematic sectional view showing a direction of formation of the lead-in passage in a related-art technology, and also is a partial enlarged view taken in the direction of an arrow H2 in FIG. 3D.
Figure 3C:
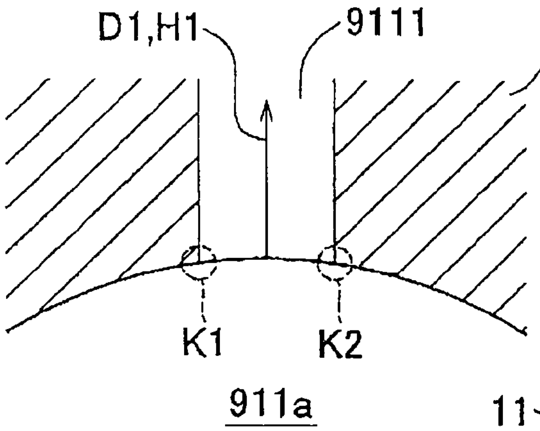
FIG. 3C is an enlarged sectional view taken on a line IIIC-IIIC in FIG. 3A.
Figure 3D:
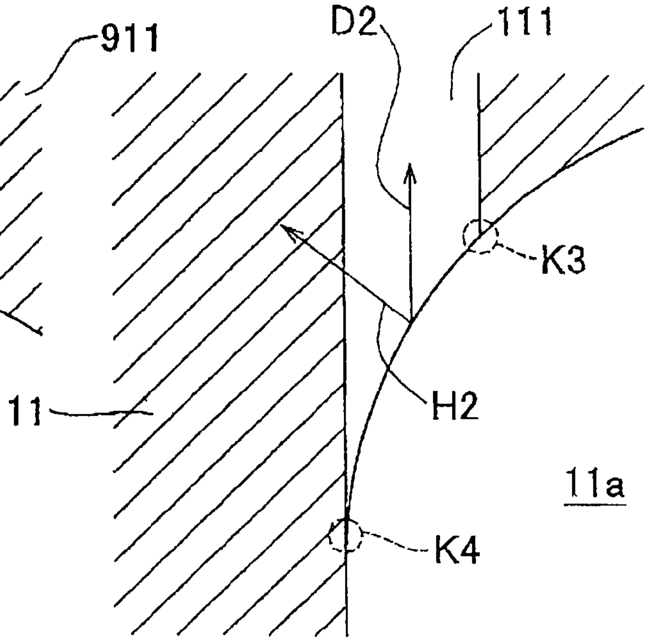
FIG. 3D is an enlarged sectional view taken on a line IIID-IIID in FIG. 3B.

The following description will be made with reference to FIGS. 3A to 3D. In FIG. 3A and FIG. 3B, the direction of arrows X is the direction of the center axis of the valve insertion hole 11*a* (or 911*a*). From results of simulations and experiments, it has been revealed that if the direction H1 of a normal line to the inner surface of the valve insertion hole 911*a* (the direction perpendicular to a tangent of the inner surface) and the direction D1 in which the lead-in passage 9111 is formed are the same (FIG. 3C) similarly to the related art, the shape of the opening portion of the lead-in passage 9111 becomes close to a generally perfect circle (FIG. 3A), and stress concentrates at corners K1 and K2 of the opening portions of the lead-in passage 9111. That is, substantially equal stresses occur in the entire peripheral edge of the opening portion of the lead-in passage 9111 in FIG. 3A. On the other hand, in the embodiment, since the direction D2 in which the lead-in passage 111 is formed is tilted with respect to a normal line H2 to the inner surface of the valve insertion hole 11*a* (FIG. 3D), the shape of the opening portion of the lead-in passage 111 in a view in the direction that the normal line H2 extends is in an elliptical shape having the minor axis that is parallel to the center axis of the valve insertion hole 11*a* (FIG. 3B). In other words, the opening portion of the lead-in passage 111 that is in the elliptical shape has a major axis that is parallel to or corresponds to a chord that connects both opening peripheries of the opening portion in a circumferential direction of the inner surface of the valve insertion hole 11*a*. Therefore, the stress that occurs in the opening portion of the lead-in passage 111 can be made smaller at any site in the embodiment than in the related art, while taking into account the stress that concentrates at corners K3 and K4 of the opening portion of the lead-in passage 111. A reason for this is that the stress concentration is reduced at the corner K4 due to its enhanced obtuse angle. Besides, the stress concentration is reduced at the corner K3, because the effect of the reduction in stress brought about by the enhanced obtuse angle of the opening portion of the lead-in passage 111 and the elongated perimeter of the opening portion as shown in FIG. 3B surpasses the influence of its acute angle of the formation direction of the lead-in passage 111 (a direction perpendicular to the axis direction of the valve insertion hole 11*a*) at the corner K3. In addition, although the direction D2 is tilted with respect to the direction H2, it is desirable that a straight line extending in the direction in which the lead-in passage 111 (which corresponds to the direction D2) is formed is coplanar with a normal line to the inner surface of the valve insertion hole 11*a* (which corresponds to the direction H2) in a section of the valve insertion hole 11*a* that is perpendicular to the axis direction of the valve insertion hole 11*a*. Specifically, the results of simulations and experiments have revealed that it is desirable that the lead-in passage 111 extends in a plane perpendicular to the center axis of the valve insertion hole 11*a*.

As described above, since the direction in which the lead-in passage 111 is formed is tilted from a line normal to the inner surface of the valve insertion hole 11*a* of the body 11, the stress concentration can be reduced, and thus, improved durability of the body 11 and therefore improved durability of the valve device can be realized.

(MODIFICATIONS) It suffices that the valve device of the invention be a valve device that has a body that has a lead-in passage that has an opening in the cylindrical inner surface of a valve insertion hole. The foregoing constructions do not restrict the valve mechanism, the pressure-regulating mechanism, etc. Besides, while the embodiment has been described in conjunction with the pressure reducing valve used as an example of the valve device, the invention is also applicable to other types of valves (an electromagnetic valve, and the like).

What is claimed is:

1. A valve device comprising:

a valve body composed primarily of aluminum and comprising a cylindrical valve insertion hole having a central axis;

a lead-in passage forming an opening in the cylindrical surface of the valve insertion hole, whereby a fluid can flow from the lead-in passage into the valve insertion hole, wherein at least a portion of the lead-in passage adjacent the opening in the cylindrical surface of the valve insertion hole is oriented such that the direction of elongation of the lead-in passage at the opening is tilted with respect to a normal line to the inner surface of the valve insertion hole at a position of the opening of the lead-in passage, in a view in a direction of the central axis of the valve insertion hole; and a valve member provided in said valve insertion hole, that is selectably engageable with a valve seat and separable therefrom to selectively form a clearance, to thereby control flow of the fluid past the valve member, wherein the valve device is configured such that the fluid flowing from the valve insertion hole to the clearance is prevented from flowing circumferentially about the central axis.

2. The valve device according to claim 1, wherein the lead-in passage extends in a plane perpendicular to the central axis of the valve insertion hole.

3. The valve device according to claim 1, wherein the lead-in passage extends straight, and an extension line of the lead-in passage which extends toward the opening of the lead-in passage is offset from the central axis of the valve insertion hole.

4. The valve device according to claim 1, wherein the valve member is a pressure reducing valve.

5. The valve device according to claim 1, wherein the opening of the lead-in passage is in an elliptical shape, in a view in an direction that the normal line extends.

6. The valve device according to claim 5, wherein a minor axis of the elliptical opening is parallel to the central axis of the valve insertion hole.

7. The valve device according to claim 5, wherein a major axis of the elliptical opening is parallel to or corresponds to a chord that connects both opening peripheries of the elliptical opening in a circumferential direction of the inner surface of the valve insertion hole.

8. A valve device comprising:

a valve body composed primarily of aluminum and comprising a cylindrical valve insertion hole having a central axis;

a lead-in passage forming an opening in the cylindrical surface of the valve insertion hole, whereby a fluid can flow from the lead-in passage into the valve insertion hole, wherein at least a portion of the lead-in passage adjacent the opening in the cylindrical surface of the valve insertion hole is oriented such that the direction of elongation of the lead-in passage at the opening is tilted with respect to a normal line to the inner surface of the valve insertion hole at a position of the opening of the lead-in passage, in a view in a direction of the axis of the valve insertion hole;

a valve member provided in said valve insertion hole, that is selectably engageable with a valve seat and separable therefrom to selectively form a clearance, to thereby control flow of the fluid past the valve member; and means for preventing the fluid flowing from the valve insertion hole to the clearance from flowing circumferentially about the central axis.

9. The valve device according to claim 8, wherein the means for preventing the fluid flowing from the valve insertion hole to the clearance from flowing circumferentially about the central axis comprises:

a guide member in the valve insertion hole;

the valve member inserted in the guide member; and an axially extending groove formed in the valve member and providing fluid communication from the lead-in passage to the clearance.

* * * * *